(12) United States Patent
Ortefa-Carrillo

(10) Patent No.: US 8,717,369 B2
(45) Date of Patent: May 6, 2014

(54) OPTO-MECHANICAL CAPTURE SYSTEM FOR INDIRECTLY MEASURING THE MOVEMENT OF FLEXIBLE BODIES AND/OR OBJECTS

(75) Inventor: Hernando Ortefa-Carrillo, Del. Miguel Hidalgo (MX)

(73) Assignee: Universidad Nacional Autonoma de Mexico, Mexico D.F. (MX)

( * ) Notice: Subject to any disclaimer, the term of this patent is extended or adjusted under 35 U.S.C. 154(b) by 691 days.

(21) Appl. No.: 12/674,487

(22) PCT Filed: Aug. 21, 2008

(86) PCT No.: PCT/MX2008/000112
§ 371 (c)(1),
(2), (4) Date: Apr. 14, 2011

(87) PCT Pub. No.: WO2009/025540
PCT Pub. Date: Feb. 26, 2009

(65) Prior Publication Data
US 2011/0187728 A1     Aug. 4, 2011

(30) Foreign Application Priority Data
Aug. 21, 2007    (MX) .................... MX/a/2007/010151

(51) Int. Cl.
*G06T 13/00*    (2011.01)
(52) U.S. Cl.
USPC .......................................... 345/474

(58) Field of Classification Search
None
See application file for complete search history.

(56) References Cited

U.S. PATENT DOCUMENTS

| | | | |
|---|---|---|---|
| 4,611,500 A | | 9/1986 | Nagano |
| 4,972,074 A | * | 11/1990 | Wright ..................... 250/227.11 |
| 5,086,785 A | * | 2/1992 | Gentile et al. ................. 600/595 |
| 6,651,352 B2 | * | 11/2003 | McGorry et al. ............... 33/512 |
| 6,868,620 B2 | | 3/2005 | Sanoner |
| 2006/0228101 A1 | * | 10/2006 | Sullivan et al. ............... 396/153 |

* cited by examiner

*Primary Examiner* — Xiao M. Wu
*Assistant Examiner* — Yingchun He
(74) *Attorney, Agent, or Firm* — Browdy and Neimark, PLLC

(57) ABSTRACT

Opto-mechanical motion capture system for indirectly measuring the movement of bodies and objects, mainly focused on joints of flexible materials, or which have deformations, which makes difficult the instrumentation with rigid sensors such as potentiometers. This invention consists of an image acquisition device or camera and a visualization bed in which there is a series of transmission cables which convey to the visualization bed the movements generated in the flexible parts to be sensed. The camera is set in such a way that it is possible to capture the image of the transmission cables, enabling the determination of its displacement and thus of the sensed objects. The main object of this invention is to enable the measurement of the movements of the flexible parts of the human body in a simple, cheap and comfortable way for the user of the device.

12 Claims, 2 Drawing Sheets

OPTO-MECHANICAL CAPTURE SYSTEM FOR INDIRECTLY MEASURING THE MOVEMENT OF FLEXIBLE BODIES AND/OR OBJECTS

FIELD OF THE INVENTION

The present invention relates to an opto-mechanical system for indirectly measuring the movement of objects and/or flexible bodies, such human or animal joints, and to map them to a character, and it is inscribed in the field of motion capture, that can be applied to animation of digital characters in movies or live performances, robot control, interfaces, interaction in general with the computer or videogames.

BACKGROUND OF THE INVENTION

There are different technical areas wherein measuring the human body movements is necessary; one of them, which has reached a great economic importance in the last years is computer animation. Within this area, record of body movements for their application to animated characters is called Motion Capture. Such animation technique consists of recording the movements of an actor and mapping them to a character. The advantage of using Motion Capture over traditional animation is that it enables to accelerate the production since it avoids the use great groups of animators who manually generate the movements frame by frame. Another advantage of this technique is that it allows giving greater expressiveness to the characters, due to the fact that the movements are directly obtained from an actor. The fact of recording the position of certain body parts, the speed of their movements, subtle accelerations and their length, gives realism to the performance of the animated characters that would not be possible otherwise.

It is easy to imagine that computer animation is not the only area where Motion Capture can be applied. Since we can determine the movements of the body parts, it is possible to use this technique as an interface mean in control areas such as tele-robotics and tele-surgery.

There are different techniques for detecting body movements; among these, the most inexpensive and the ones that offer greater precision are the ones that use mechanical means for carrying out the measurements. The systems based on these types of techniques are called Mechanical Motion Capture Systems. Generally, these types of systems seek to measure the existing flexion among the moving body parts. The main difficulty is that connecting sensors to flexible parts of the body is required. Generally, such sensors are stiff electronic devices, such as potentiometers, encoders, etc.; therefore, their use is usually uncomfortable and not very practical.

The main object of the present invention is to allow the measuring of the movements of human or animal flexible bodies by mechanical means in a simple, cheap and comfortable way for the user of the device.

There are different methods in the state of the art for recording the human body movements with different purposes: computer animation, control, robotics, among others. This measuring and recording of the human body movements is called Motion Capture, and has reached importance in the last years due to its application in computer animation. A. Menache. Understanding motion capture for computer animation and video games. San Diego: M. Kaufmann: Academic, c2000.

In order to carry out an animation using motion capture, you simply record the relative or absolute position of each moving body part of an actor and such data are mapped to the moving body parts of a character.

There are different motion capture systems, which, according to the techniques used can be classified in three great groups: optical, magnetic and mechanic.

Optical systems use markers over the moving parts of a body, such markers are recorded by cameras from different points of view so that afterwards, by means of triangulations, to infer the tridimensional position of each one of these markers within a certain space. One of the problems of this type of systems is that the space where the markers can be recorded is limited by the number, the position, visual field and resolution of the cameras. Such space should also have an adequate illumination and if possible, there should not be any objects obstructing the visibility of the cameras.

Despite maintaining a controlled environment within the capture space, sometimes it is not possible to avoid the occlusion of the markers by the actors body parts. The occlusion can be avoided by increasing the number of cameras, thus covering a bigger number of points of view, but therefore increasing the necessary computer power to calculate the position of the markers. The calibration of these systems can also takes longer since you have to know the position of each of the cameras and to calibrate each one of them with a series of pattern marks. Due to the complexity and the amount of equipment needed, these systems are usually very expensive.

The main advantage of optical systems is that the user does not need to carry any type of sensors, but only clothes of a color contrasting the color of the markers, so that he/she is able to freely move within the capture space. Another advantage is that it is possible to capture the motion of multiple actors at the same time and within the same capture space.

Magnetic systems use a series of electromagnetic field emitters that send signals at different frequencies, which can be detected within a certain field of action by a series of sensors. The principle used by these systems is that the field intensity decreases evenly and proportionally to the distance between emitter and receiver, therefore it is possible to calculate the existing distance between a field emitter and a sensor; the emission frequency of said field is useful to distinguish the specific field it is about.

Knowing in advance the position of each field emitter, it is possible to calculate by triangulation the position of each sensor, so that each sensor is fixed on each body part which position must be known. The main disadvantage of these types of systems is that it is very sensitive to the interference generated by metallic objects that alter the electromagnetic field between the emitter and the receiver, so that it is required to keep such area within a controlled environment. Another disadvantage is that the measurements, such as with optical systems, are also limited to a specific area. The advantage of these systems compared to optical systems is their price.

Finally, mechanical systems are those based on direct measuring, by means of mechanical contact, of the existing flexion between two moving body parts, such as the joints. This flexion generally represents a rotation or relative displacement between one part and the other. In order to be able to carry out the measurements, the sensors are directly arranged on the body forming a sort of exoskeleton on the same. Generally, the direct measuring of the body movements is more precise, so this is why this is the method used in tele-surgery, at a lower cost. However, the use of sensors on the body can lead to an obstruction problem if it is not adequately treated. The simplest systems arrange rigid electronic devices such as potentiometers, encoders, etc., on the moving parts of the body, all of these subject to a rigid exoskeleton that guarantees the correct position of such sensors. It is easy to observe that this methodology can be uncomfortable. However, there are more complicated and expensive systems that use flexible sensors like optic fibers and stress-measuring calipers, which are also put on the moving body parts by means of tight clothes, thus forming a flexible exoskeleton. Even though using flexible sensors produces a little accuracy lost when measuring the movements, it is also true that such accuracy is not necessary concerning the animation field.

The system of the present invention solves the existing problems in the motion capture systems, by retaking the advantages of the mechanical systems with flexible sensors and combining it with the advantages of the optical systems, but at a lesser cost.

The methodology used is based on detection and transmission of the movements of the body by mechanical means and measuring each one of them by optical means. With this mixed procedure, the disadvantages inherent to both applied methodologies are eliminated.

DETAILED DESCRIPTION OF THE INVENTION

The system of the present invention allows indirectly measuring the movement of objects and/or human bodies or animals, particularly, the different flexible parts of the human body or of animals, using only one sensor and multiple flexible mechanical transmissions.

The invention in general is referred to an opto-mechanical motion capture system for indirectly measuring the movement of objects and/or bodies, that includes: at least one image acquisition device or camera (1), which function is to capture the image (3) of the group of transmission cables (5) within the display bed (2) that at the same time is formed by a group of hollow grooves in which interior, each one of the transmission cables pass freely (5) that at the same pass through the inside of a flexible conduit (4) which end is fixed the support element (6) and from which the transmission element is left exposed (5) that runs freely and that fixes its end in the opposite support element (7), the flexible support (8) on which the support elements (6 and 7) can be coupled, maintains a distance between the base of both of them (d1).

Particularly this opto-mechanical movement capture system is characterized because it only uses one opto-electronic sensor and multiple flexible mechanical transmissions.

Besides, the visualization bed (2) allows to arrange in columns each one of the transmission cables which position is proportional to the flexion existing in the moving parts to be sensed, and is particularly formed by a group of hollow grooves or reserved spaces in which interior, each one of the transmission cables pass freely (5), and, at the same, these serve as markers before a camera. Thanks to the visualization bed is that there can only be one sensor that can detect the movement of all the markers on a centralized way.

Another particularity of the invention is that the flexible conduit (4), in which the transmission cable moves freely (5) too, is fixed to the visualization bed (2).

The particularities of the present invention, concerning the materials with which it can be made are the following:

The transmission cables (5) can be made of steel, material-type plastic thread or any other material.

The visualization bed (2) can be built with any material, such as glass, plastic, transparent cellular polycarbonate or any other material that enables watching inside the same.

The side (2.a) of each groove, visible to the camera (1) can be built, among others, with a transparent material such as glass, plastic, transparent cellular polycarbonate or any other material that enables seeing the position of each transmission cable inside them.

The opposite side (2.b) of the visualization bed must be opaque and contrasting to the transmission cables color. The opposite side (2.b) of the visualization bed can be painted or obstructed with any other material such as poster board or paper.

After having described the aforementioned, it can be said that the functioning principle of this invention is as follows:

Each flexible support (8) is coupled to a joint to be sensed, in such a way that each of the supports (6) and (7) are on opposite ends of the same, detail F of FIG. 2.

The opposite end of each flexible transmission is arranged on the visualization bed (2) in such way that it can be visualized by the camera (1).

After everything is arranged on this way, when any flexion takes place on the sensed joint, G detail of FIG. 2, the magnitude of such flexion can be detected by the camera (1).

One of the applications of this optical mechanical movement capture system of the present invention is to enable detecting and transmitting in a mechanical way the movements to be sensed, conveying them by flexible mechanical means to a central sensor where they are optically measured. In this way, disadvantages of the merely optical, mechanical or magnetic systems are counteracted, and their advantages are used in the best possible way.

With the aforementioned, the use of the visualization bed guarantees a contrast mean where the transmission cables position is related to the displacement of the moving parts to be sensed. This bed also guarantees the restricted movement of such markers, so that great computer resources are not required to estimate the movements such as in the traditional optical systems.

Each marker inside the visualization bed is mechanically connected to the element which element we wish to sense, by means of a flexible transmission. Thus, all the movements are taken from the place they are generated to the place where they shall be detected and which by definition is always visible for the central sensor. This solves the markers occlusion problem inherent to the traditional optical systems.

Motion detection in the visualization bed is electrically disconnected so that it will not be affected by static electricity discharges or electromagnetic fields, such as happens with mechanical and optical systems that require controlled environments.

One of the main advantages of using only one sensor, is that the system can be protected from the electromagnetic noise on a centralized way, that is, shielding the electronic element only.

Due to the fact that motion measuring is carried out by optical means, there is neither deterioration, nor the noise produced by friction, which is a characteristic of the mechanical systems that use potentiometers.

Mechanical transmissions that convey the movements to the markers are made of flexible materials similar to those of medical probes. Such flexibility guarantees the free movement of the human body flexible parts, without subtracting fidelity to the measurements of their displacements or rotations.

Figure 1:
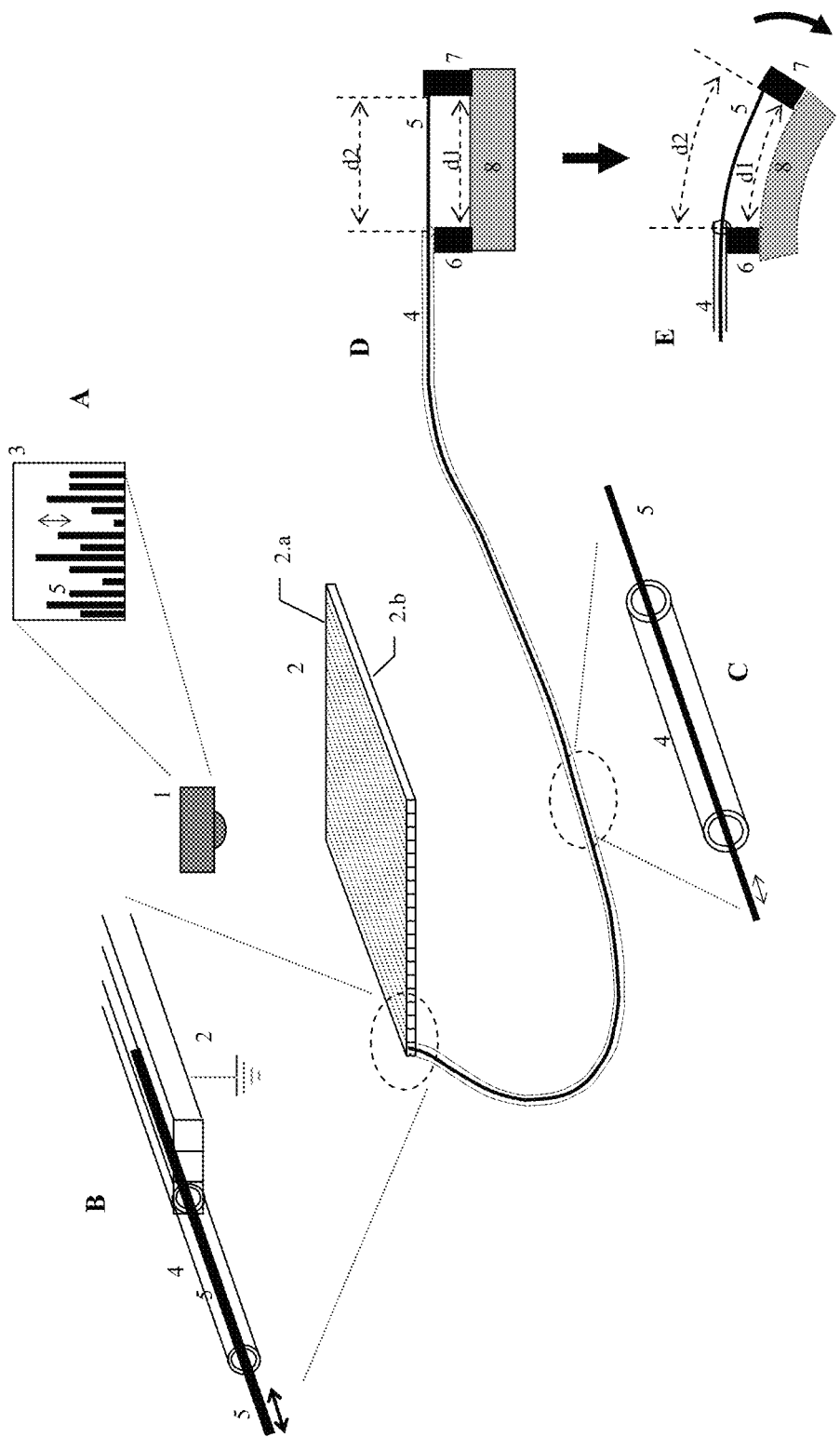
FIG. 1 is a conventional perspective of the present invention. Details A, B, C, D and E show with more accuracy the parts forming the system.

Detail (A) presents the image acquisition device which we will call "camera" (1) and the image (3) of the group of transmission cables (5) inside the visualization bed (2).

Detail (B) shows the visualization bed (2) formed by a group of hollow grooves in which interior each one of the transmission cables (5) pass freely. The flexible conduit (4), in which the transmission cable (5) also passes freely, is fixed to the visualization bed (2).

The visualization bed (2) shows the visible side (2.a) to the camera of each groove, which shall be transparent, and the opposite side (2.b) of the visualization bed (2) which shall be contrasting to the cables color.

Detail (C) shows the group formed by a flexible conduit (4) and a transmission cable (5), called "flexible transmission", this mechanism is also known as "lash", and its function is conveying the movement from the place where it is generated to the visualization bed.

In detail (D) it is shown the support element (6) on which the flexible conduit end is fixed (4) and from which the transmission element is left exposed (5) freely running, fixing its end on the opposite support element (7). The flexible support (8) on which the support elements (6) and (7) can be coupled, maintains a distance between the bases of both of them (d1). If no flexion exists, the distance between the base of the support elements (d1) and their upper part (d2) will be the same. In this case the position observed of the transmission cable inside the visualization camera (3) shall be taken as an initial or reference position.

Detail (E) shows the same components of detail (D) when there is a flexion. It can be seen that the distance (d2) between the upper ends of the supports (6) and (7) will be proportionally increased to the induced flexion. Thus, the transmission cable (5) is pulled by means of the flexible conduit (4) and this can be observed at the visualization bed (2) as a fold of the corresponding cable.

Figure 2:
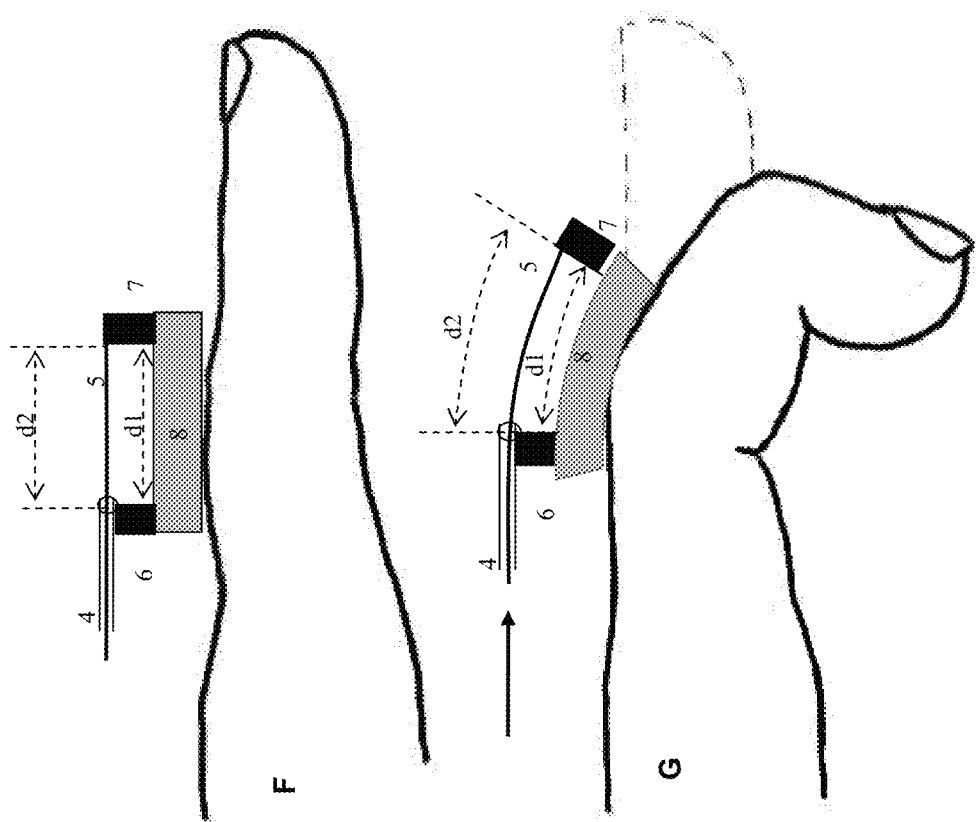

FIG. 2 shows the detail F and G, which present the same components as the details D and E of FIG. 1, detail F shows the flexible support (8) coupled the joint to be sensed, in such a way that each one of the supports (6) and (7) are on opposite ends of the same.

In detail G there is the support (8) coupled to the joint to be sensed at the moment any flexion takes place.

EXAMPLES

The following example is presented only to illustrate the invention, but do not limit the same in any way.

Example 1

Motion Detection for the Human Body

In order to corroborate the feasibility of this invention, a system such as the one of FIG. 1 was built. The elements forming it were implemented as follows:
  A web cam was used as an image acquisition device, with a capture speed of 30 frames per second and a 640×480 resolution, set 10 cm away from the visualization bed. The images obtained with this device were sent to a computer to be processed.
  In order to build the "lashes", stretches of 1.5 m of steel wire of 0.5 mm diameter and flexible covers made with vinyl pipe of 1.45 m with an inner diameter of 1 mm and an outer diameter of 2 mm were used.
  A 20×20 transparent cellular polycarbonate plate of 2 mm thick, with a contrasting background made with a white paper posterboard, was used as visualization bed.

The flexible support (8) was coupled to a joint leaving each of the support elements (6) and (7) on opposite ends of the same (FIG. 2, detail F).

The other end of the transmission cable was arranged in a transparent bed formed by grooves, so that it could be seen from the camera.

When the joint of the FIG. 2 detail G is folded, the cable is pulled in relation to its cover, thus causing a displacement easily detected by the camera (1) at the visualization bed (2).

Likewise, it is possible to measure the motion of joints which movements are more complex, such as the base of the thumb and the wrists. This was achieved by arranging a flexible transmission for each one of the joints and for each degree of freedom of the same.

The following features were observed in the device built:
  Motion capture frequency: 30 samples per second per sensor.
  Maximum number of sensors: 40.
  Accuracy in the joint rotation: 1 degree, error: +−0.25 degrees.

Having described my invention, I consider it as a novelty and therefore I claim as my exclusive property the content of the following claims:

1. Opto mechanical motion capture system for continuous measuring the movement of objects and/or flexible bodies indirectly comprising: at least one device for acquiring images; a visualization bed formed by a group of hollow grooves, with said of each of these hollow grooves have inside a flexible conduit, with said of each flexible conduit have inside a transmission cable; an image of the group of transmission cables inside of the visualization bed, with said image being captured by the device for acquiring images; for each flexible conduit, a first bearing element attached to the one end of the flexible conduit outside the visualization bed and a second bearing element attached to another end of the transmission cable outside the visualization bed such that the transmission cable is able to run freely out of the flexible conduit; a third flexible bearing element maintains a fixed distance between the bottom part of the first and second bearing elements.

2. Opto mechanical motion capture system for continuous measuring a movement of objects and/or flexible bodies indirectly as claimed in claim 1, wherein only one device for acquiring images is used to detect multiple flexible mechanical transmission cable movements, through the image captured from the visualization bed.

3. Opto mechanical motion capture system for continuous measuring a movement of objects and/or flexible bodies indirectly as claimed in claim 1, wherein the visualization bed allows generation of a detected image by using the group of hollow grooves to arrange transmission cables in columns in front of the device for acquiring images.

4. Opto mechanical motion capture system for continuous measuring a movement of objects and/or flexible bodies indirectly as claimed in claim 3, wherein the image capture device can detect all the movements of each the transmission cables, said transmission cables serve as markers, so said movements are related to the movement and flexion in the object and/or bodies to be sensed.

5. Opto mechanical motion capture system for continuous measuring a movement of objects and/or flexible bodies indirectly as claimed in claim 4, wherein the hollow grooves of the visualization bed as well as the flexible conduits are built with transparent material.

6. Opto mechanical motion capture system for continuous measuring a movement of objects and/or flexible bodies indirectly as claimed in claim 5, wherein the visualization bed has one side built in a contrasting color compared with the color of the transmission cables, said transmission cables are used as markers.

7. Opto mechanical motion capture system for continuous measuring a movement of objects and/or flexible bodies indirectly as claimed in claim 6, wherein the device for acquiring images is located in opposite side of the contrasting color side of the visualization bed.

8. A method for continuous measuring movements of objects and/or bodies indirectly using the opto mechanical motion capture system as claimed in claim 1, wherein the said object and/or bodies movements are detected and transmitted by flexible mechanical means to a device for acquiring images, where they are optically measured, said measured movements are used for animation.

9. Opto mechanical motion capture system for continuous measuring a movement of objects and/or flexible bodies indirectly as claimed in claim 1, wherein the system can detect 40 or more object movements, through the transmission cables used as markers.

10. Opto mechanical motion capture system for continuous measuring a movement of objects and/or flexible bodies indirectly as claimed in claim 1, wherein the motion capture frequency is at least of 30 samples per second.

11. A method for continue measuring a movement of objects and/or bodies indirectly using the opto mechanical motion capture system as claimed in claim 1, wherein the said movements of objects and or bodies are applied to digital animation, and/or applied as interface with computers or videogames.

12. Opto mechanical motion capture system for continuous measuring a movement of objects and/or flexible bodies indirectly as claimed in claim 1, wherein the device for acquiring images, is a camera.

* * * * *